United States Patent
Franchek et al.

(10) Patent No.: US 11,125,043 B2
(45) Date of Patent: Sep. 21, 2021

(54) MODEL-BASED MONITORING AND USEFUL LIFE ESTIMATION FOR BLOWOUT PREVENTER ANNULARS

(71) Applicant: University of Houston System, Houston, TX (US)

(72) Inventors: Matthew Franchek, Houston, TX (US); Oussama Hattab, Houston, TX (US); Moadh Mallek, Houston, TX (US)

(73) Assignee: University of Houston System, Houston, TX (US)

( * ) Notice: Subject to any disclaimer, the term of this patent is extended or adjusted under 35 U.S.C. 154(b) by 290 days.

(21) Appl. No.: 16/087,697

(22) PCT Filed: Mar. 22, 2017

(86) PCT No.: PCT/US2017/023650
§ 371 (c)(1),
(2) Date: Sep. 24, 2018

(87) PCT Pub. No.: WO2017/165560
PCT Pub. Date: Sep. 28, 2017

(65) Prior Publication Data
US 2019/0093440 A1   Mar. 28, 2019

Related U.S. Application Data

(60) Provisional application No. 62/312,086, filed on Mar. 23, 2016.

(51) Int. Cl.
*E21B 33/06* (2006.01)
*G01M 13/003* (2019.01)
(Continued)

(52) U.S. Cl.
CPC .............. *E21B 33/06* (2013.01); *E21B 47/00* (2013.01); *G01M 13/003* (2019.01); *G06F 30/20* (2020.01); *G06F 2111/10* (2020.01)

(58) Field of Classification Search
CPC ...... E21B 33/06; E21B 47/00; G01M 13/003; G06F 30/20; G06F 2111/10
See application file for complete search history.

(56) References Cited

U.S. PATENT DOCUMENTS

2005/0175193 A1* 8/2005 Karjalainen ............. H04R 3/04
381/103
2005/0222772 A1 10/2005 Koederitz et al.
(Continued)

OTHER PUBLICATIONS

Jackson, Brian, "Digital filter design and synthesis using high-level modeling tools", 1999, Virginia Polytechnic Institute and State University, pp. 7-8 (Year: 1999).*

(Continued)

*Primary Examiner* — Tarun Sinha
*Assistant Examiner* — Yossef Korang-Beheshti
(74) *Attorney, Agent, or Firm* — Jackson Walker LLP

(57) ABSTRACT

Reduced order modeling is used in the present systems and methods for monitoring the health of a system and is particularly useful in monitoring the health and estimating the remaining useful life of blow out preventer (BOP) annular used in an oil or gas well. A reduced order model is a linear low order characterization of the system that describes the annular behavior with a small number of parameters that can be interpreted physically. The reduced order model is then identified and adapted in real-time in order to detect the change in the system behavior and characteristics. This adaptation helps in drawing conclusions on diagnostics and prognostics of the physical system.

2 Claims, 6 Drawing Sheets

(51) Int. Cl.
*E21B 47/00* (2012.01)
*G06F 30/20* (2020.01)
*G06F 111/10* (2020.01)

(56) References Cited

U.S. PATENT DOCUMENTS

| | | |
|---|---|---|
| 2008/0185143 A1 | 8/2008 | Winters et al. |
| 2012/0197527 A1 | 8/2012 | McKay et al. |
| 2014/0231075 A1 | 8/2014 | Springett et al. |
| 2015/0292980 A1 | 10/2015 | Veeningen |
| 2015/0330173 A1* | 11/2015 | Trivedi .................. E21B 33/06 73/152.29 |
| 2016/0160598 A1* | 6/2016 | Springett ............. E21B 33/062 166/250.05 |
| 2016/0237773 A1* | 8/2016 | Dalton ............... G05B 23/0283 |

OTHER PUBLICATIONS

Menon, P.K., "Mathematical Models of Dynamical Systems for Control System Design", 2011, IEEE Control Systems Society, Seminar on "Modelling and Simulation of Dynamical Systems", p. 21 (Year: 2011).*

Notification of Transmittal of the International Preliminary Report on Patentability for PCT/US2017/023650 dated Oct. 4, 2018 from the International Bureau of WIPO, containing the Written Opinion of the International Searching Authority—Korea, dated Jun. 26, 2017, 7 pages.

* cited by examiner

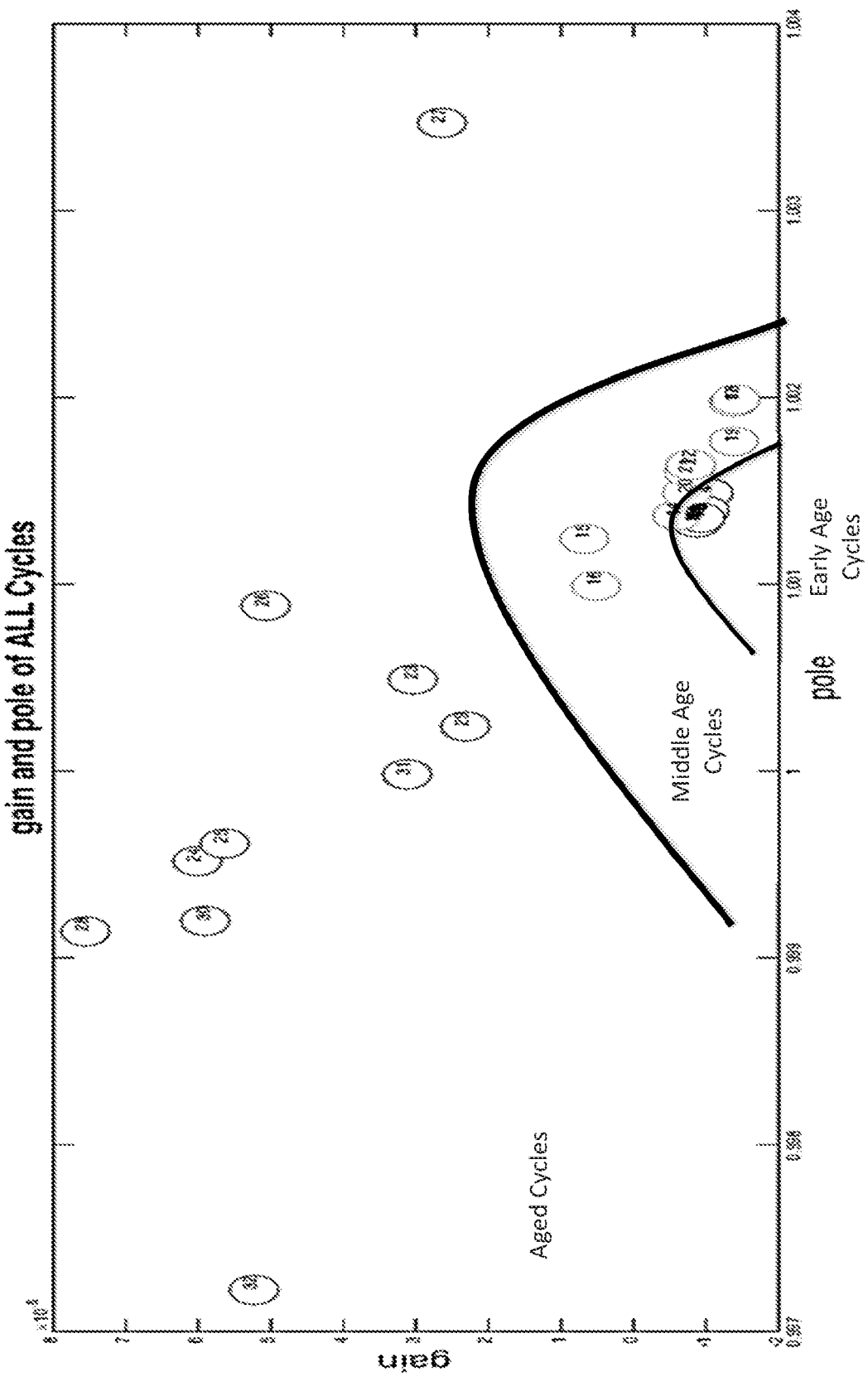

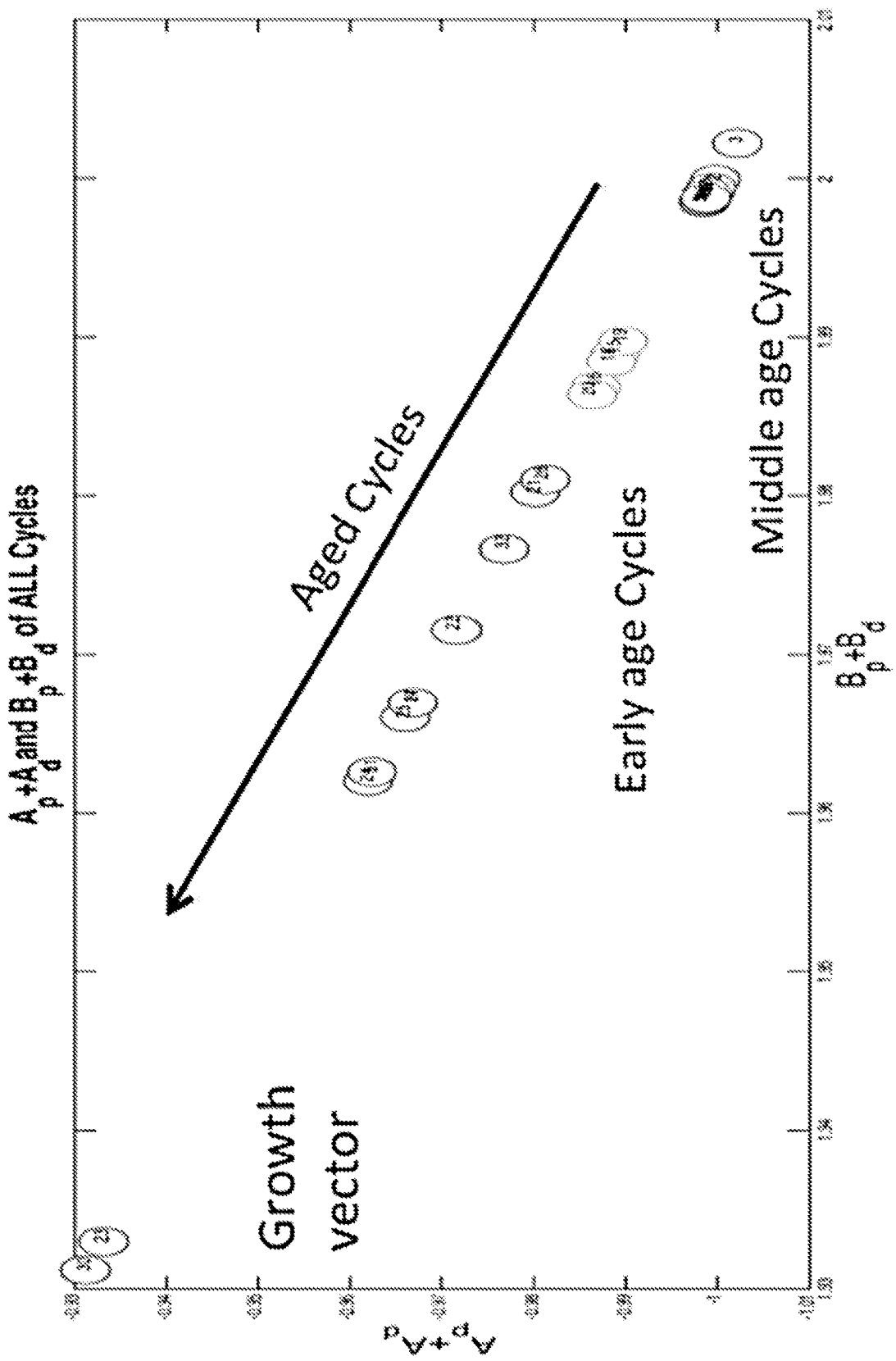

MODEL-BASED MONITORING AND USEFUL LIFE ESTIMATION FOR BLOWOUT PREVENTER ANNULARS

This application claims priority to U.S. Provisional Patent Application No. 62/312,086, entitled "Model-Based Monitoring and Useful Life Estimation for Blowout Preventer Annulars, filed on Mar. 23, 2016, the entire contents of which are hereby incorporated by reference.

BACKGROUND

This disclosure pertains to a model-based diagnostic method for health-monitoring and estimation of remaining useful life for blowout preventer annular systems.

A blowout preventer (BOP) is a specialized device used to seal or monitor oil and gas wells to prevent blowout, which is an uncontrolled release of oil or gas from a well. Multiple blowout preventers may be installed for a single well. Blowout preventers control downhole pressure and oil and gas flow, but will also prevent pipes and casings from being blown out of the wellbore in the event of a blowout. These devices are critical to the safety of the crew, the equipment, and the environment.

There are two types of blowout preventer that are the most common: ram and annular. A well frequently has both types installed, with an annular BOP typically stacked above several ram BOPs. Due to the criticality of these devices, regulations require regular inspection, testing, and repair of BOPs. The gathering of damaged condition data is an issue of primary concern in health monitoring of BOPs. Monitoring the health of BOPs is a difficult process. Current health monitoring approaches basically utilize historical time to failure data to estimate the system characteristics and predict liability in the future. Errors in monitoring may lead to either a potentially catastrophic blowout or to the premature repair or replacement of a BOP.

SUMMARY

The present disclosure relates generally to systems and methods for monitoring the health of a system, particularly to monitoring the health and estimating the remaining useful life of a blow out preventer (BOP) annular used in an oil or gas well. The method involves tracking the mechanical characteristics and operational phases of the annular in real time. The method also checks the evolution of the annular health along with operation cycles.

The method described herein presents a new approach to deal with the health monitoring and useful life estimation problems associated with BOP annulars, but it can be applied to any type of system. The method permits users to draw conclusions about actual physical properties of the system without having to deal with complicated and time-consuming physical models. This advantage becomes fundamental in health monitoring and useful life estimation of annular BOPs, as well as any types of equipment used in oil and gas wells, because there is typically a large amount of data collected.

The method described herein also facilitates diagnostics and prognostics algorithms to be implemented because it gives a visual understanding of the system health and remaining useful life. It can be seen in a graph that encompasses all the physical characteristics of the system.

BRIEF DESCRIPTION OF THE DRAWINGS

FIG. 4 shows pole location versus gain, for gain and pole location expansion over cycles.

FIG. 5 shows cumulative pressure and displacement effects on pole location versus gain and a growth vector for a model based on infinite impulse response models.

DETAILED DESCRIPTION OF PREFERRED EMBODIMENTS

The present disclosure relates to a system and method for health monitoring and remaining useful life estimation of blow out preventer (BOP) annulars used in oil and gas wells, but it can be applied to any type of system in need of health monitoring and remaining useful life estimation. The method described herein is particularly useful for health monitoring and remaining useful life estimation where field data is collected, such as field data collected for annular BOPS.

Field data collected for annular BOPs contains a huge amount of information. In order to effectively utilize a method for health monitoring using this field data, it is important to shorten this information as much as possible. Instead of using a computational multi-physics model in the system, which has many numerical issues and requires a lot of computation, a reduced order model is used to overcome these problems. A reduced order model is a low order characterization of the system that describes the annular behavior. It encloses all the information contained in the field data with a small number of parameters that can be interpreted physically. The reduced order model is then identified and adapted in real-time in order to detect the change in the system behavior and characteristics. The adaptation of the model is achieved by finding the model parameters that minimize the error between measured and estimated data. In order to ensure this adaptation, an identification technique should be implemented that works in real time. Change in parameters found during adaptation gives an idea about physical changes confronted by the real system. This adaptation helps in drawing conclusions on diagnostics and prognostics of the physical system.

Figure 1:
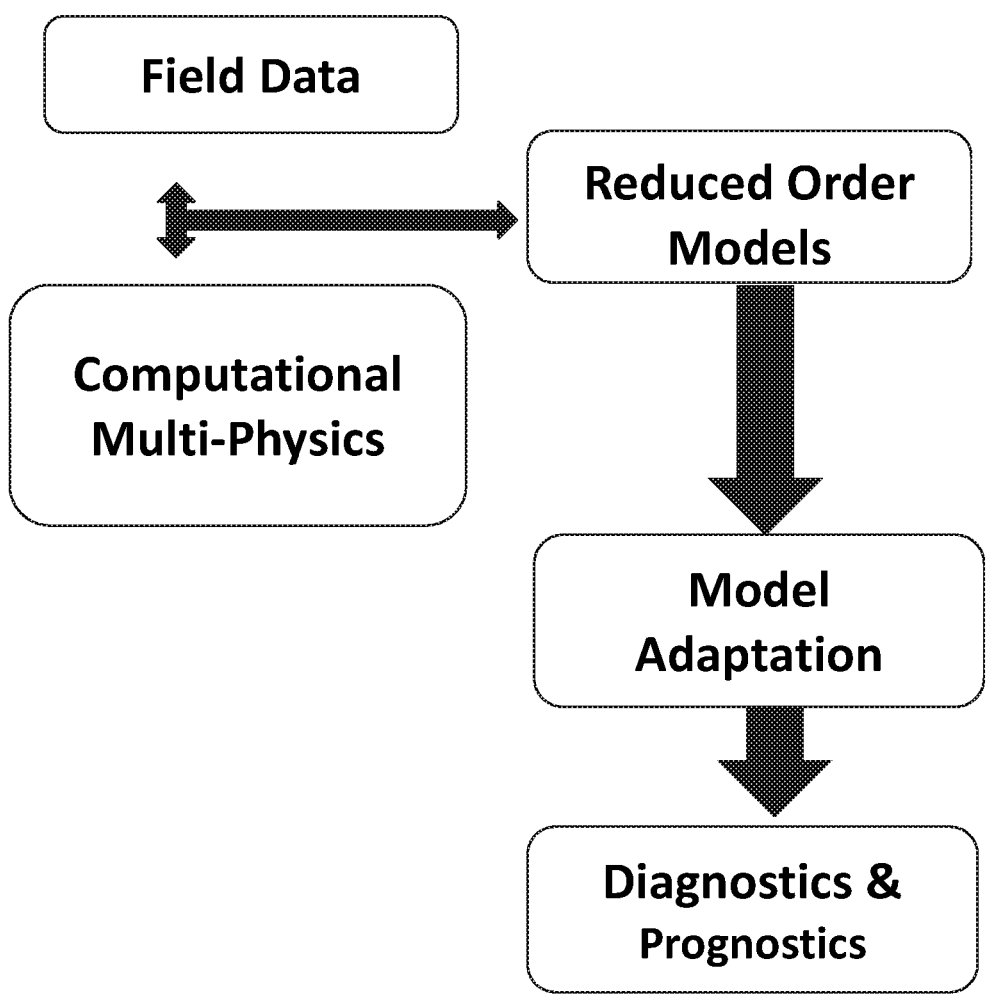
FIG. 1 shows a flow chart illustrating how reduced order models can be utilized in conjunction with the collected field data for model adaptation and diagnostics and prognostics.

FIG. 1 shows a flow chart illustrating how reduced order models can be utilized in conjunction with the collected field data for model adaptation and diagnostics and prognostics.

In the diagnostics and prognostics step, the objective is to represent the model adaptation found in the previous step into an understandable graph, which indicates the health of the system. By means of locating the current model coefficients in the corresponding region in the health graph, conclusions can be drawn about the current health of the system.

Figure 2:
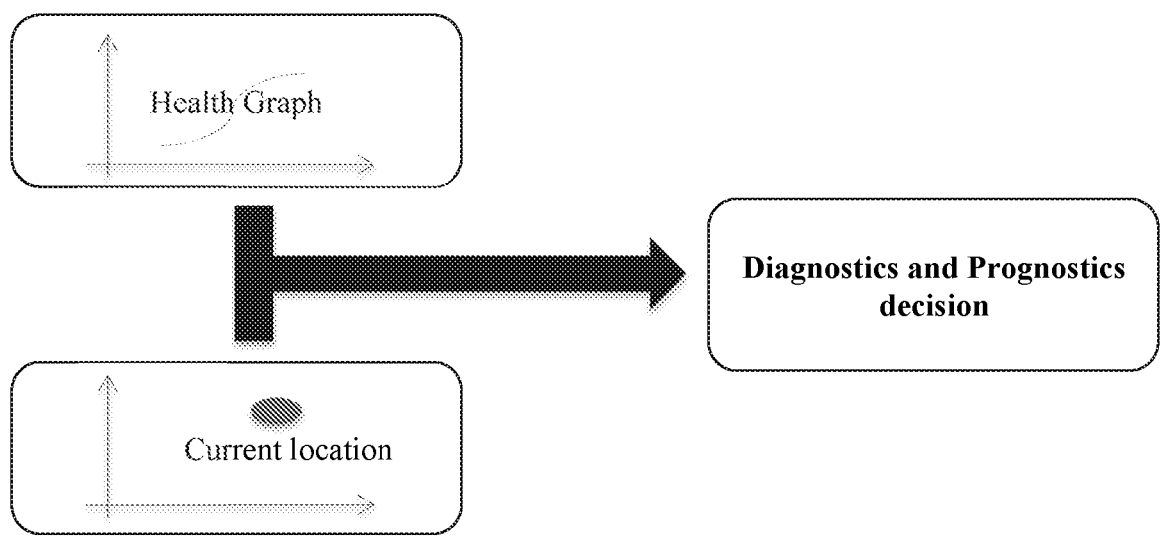
FIG. 2 shows a flow chart illustrating how the health graph obtained from model adaptation can be used in conjunction with the current location of the system within that health graph to make a diagnostics and prognostics decision.

FIG. 2 shows a flow chart illustrating how the health graph obtained from model adaptation can be used in conjunction with the current location of the system within that health graph to make a diagnostics and prognostics decision. With the system health quantified, remaining useful life can be estimated.

In the model adaption step described above, preferably two system identification techniques are used to predict the annular model parameters using field data gathered. First is Recursive Least Squares: This method takes a chosen segment of input-output data and minimizes the sum of the squares of errors between measured and estimated data. Second is Observer based adaptive identification: Given the same chosen data, the method estimates model coefficients along with states of the system using an observer technique in which a higher dynamic model tries to imitate the real model. The technique permits minimization of the error compared to measured data. Both identification techniques described above are advantageous in the way that they permit the identification of reduced order model parameters in real time. Indeed, the proposed estimation changes as new data is introduced, allowing for the detection of system changes of any nature during operation.

In a preferred embodiment of the present method, the first step is to obtain field data for a BOP annular. Some examples of field data include pressure, flow, displacement, and cylinder velocity. These types of data may be used in various combinations, and the field data used in a particular model does not need to utilize all examples of data simultaneously. Next, a reduced order model is developed describing the behavior of the system. The reduced order model is developed using physics based methods and data driven modeling methods sometimes referred to as big data analytics. Data driven modeling methods include empirical methods that predict a system model based on input and output data observation. Big data analytics involves collecting, organizing, and analyzing large sets of data. Because of the amount of data involved, this step is typically performed using specialized software tools and applications such as MATLAB® by MathWorks (Natick, Mass.), or any vector machine-based computational software. The analysis techniques may include text analytics, machine learning, predictive analytics, data mining, statistics, and natural language processing. The field data that is analyzed and used to develop the reduced order model includes input-output of the model, such as close pressure and displacement of the annular. After that, parameters are identified to use for reduced order modeling. The parameters have physical interpretations and may include pole location and gain of the model. Next, the selected parameters are adapted to track the system changes. Parameter estimation techniques are known in the industry and in literature relating to system identification and adaptive control. Finally, the health of the system is monitored and the remaining useful life is estimated with respect to the normal operating condition.

The described approach represents a revolutionary method in health monitoring and useful life estimation because it permits condensing of the complex character of the system as well as the data gathered in the field. Indeed, it puts all the physical characteristics of the system into a visually understandable graph, which can be a vector in the space or an expansion phenomenon in the same parameters space or a change in the direction of the parameters trace in time.

Not only does this method permit monitoring of the health of the system for diagnostics and prognostics purposes, but also it allows having a physical understanding of the system, which gives users the ability to interpret the behavior of the system and its characteristics.

The method has been proven to work in the case of blowout preventer annular health monitoring in different ways.

Example 1. Gain and Pole Location Trace in Real-Time

Real field data of an annular BOP is used in this analysis. The data comprises pressure and displacement of the annular for 32 operational cycles. Each cycle consists of a closure and open process of the annular during which a wellbore pressure kick is launched.

A huge amount of data was processed including transient and steady state response. This data was compacted into an easy to interpret format that encloses the whole mechanical characteristics of the annular. The data was processed using MATLAB®. Relevant data was extracted from the huge volume of data that was recorded. The available data was arranged in a comprehensible format.

One illustrative reduced order model that describes the behavior of the system is a first Order Model described by the following discrete transfer function:

$$\frac{Y}{U} = \frac{bz^{-1}}{1 - az^{-1}}$$

where:
Output, Y=Close Pressure, or command pressure at the inlet of the annular for the close function;
Input, U=Displacement, namely the cylinder displacement, or integrated volumetric flow rate, namely the integrated velocity, acting on the annular;
a fixed Sampling Time, $T_S$=0.005 min for this illustrative example; and
$z^{-1}$,=one back sample on the data.

The system identification method used to identify the system parameters was a novel observer-based identification technique. In this example, the parameters to identify were pole location, a, and gain, b. Pole location is the value at which the transfer function denominator goes to zero. This value determines whether the system is stable and how well the system performs. The gain reflects the stiffness of the annular material.

Figure 3A:
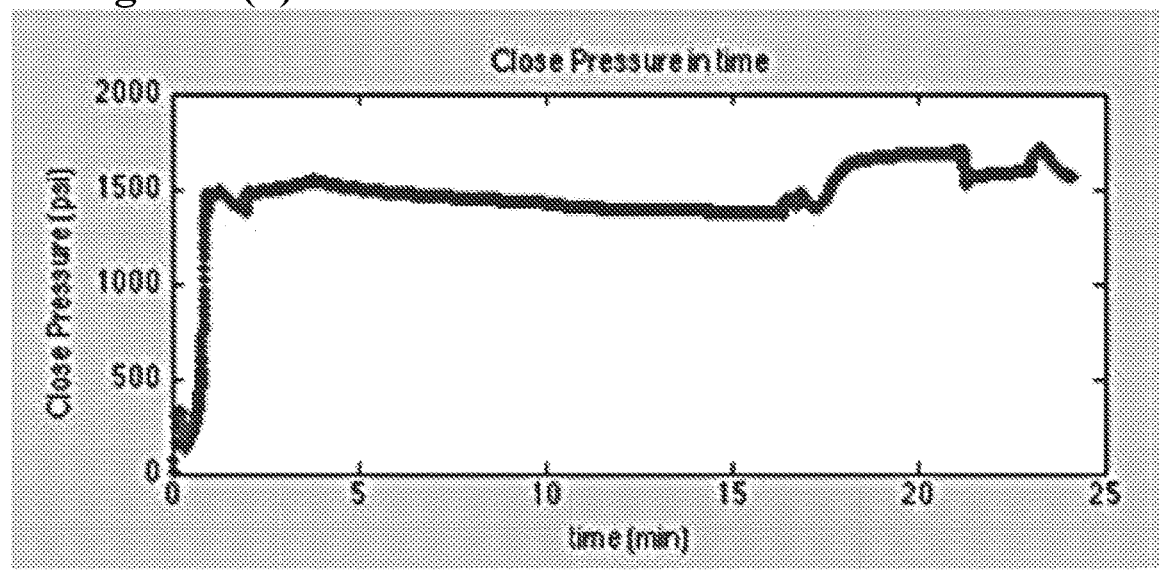
FIG. 3 shows (a) close pressure over time, (b) wellbore pressure over time, and (c) pole location versus gain, for gain and pole location trace in real-time.
Figure 3B:
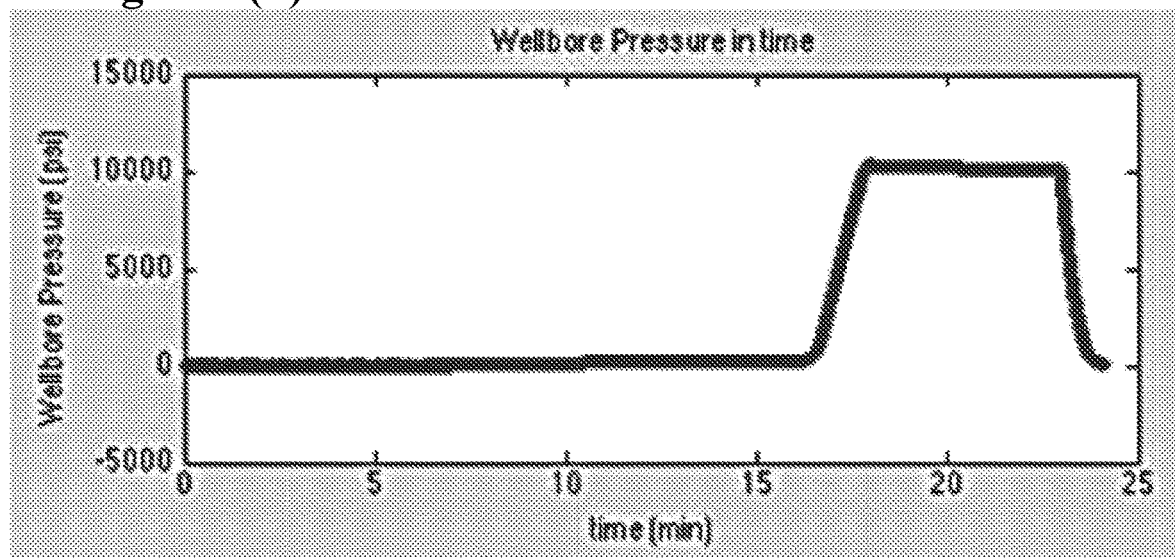
Figure 3C:
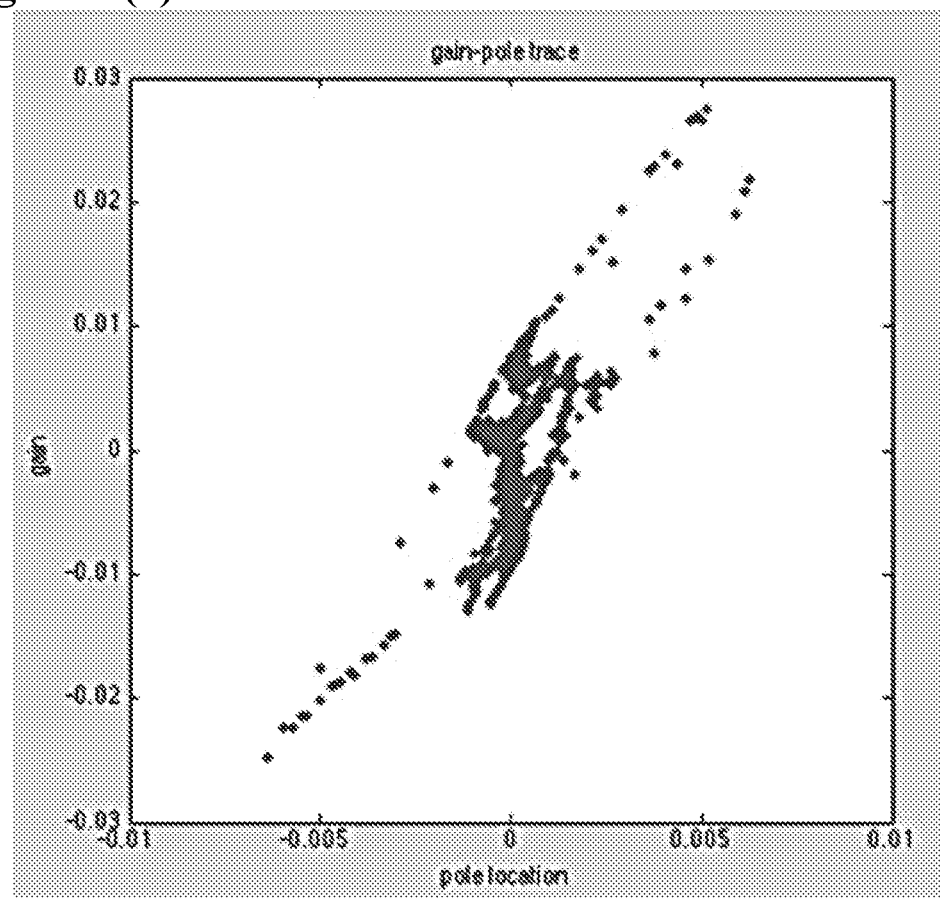

FIG. 3 shows the trace of the model gain and pole location in real time. FIG. 3(a) shows the close pressure over time. FIG. 3(b) shows the wellbore pressure over time. FIG. 3(c) shows pole location versus gain.

One advantage of using a reduced order model is that identified coefficients have a physical interpretation so that mechanical characteristics are tracked.

Conclusions can be drawn on changes in annular characteristics in conjunction with the operational phases that the annular experiences, such as closure before and after contact with pipe and the effect of wellbore pressure increase on the mechanical behavior of the annular. These changes are detected as the trace changes of direction (indicating that mechanical behavior of the annular material has changed due to a phase change such as contact with pipe or aging) or change in operational point (indicating that there has been a sudden action such as a well bore pressure kick).

Example 2. Gain and Pole Location Expansion Over Cycles

The same reduced order model was used as in Example 1. However, the transient part of the pressure and displacement data was taken into account. Every gain and pole location corresponded to one cycle. Locations of the parameters were compared over cycles to determine the age of the system.

This method allows the operator to investigate the remaining useful life and indicate the health of the system over time, which is in this case is the blowout preventer annular. The model based design of the annular eases the distinction between aged and early age cycles since every physical value has a direct impact on the gain or the pole. In this example, the sampling time, Ts, was 0.05 seconds, but this is not a unique value and can be varied. The data should be sampled or resampled to produce a fixed sampling rate within the data.

FIG. 4 shows pole location versus gain for all cycles. In FIG. 4, three regions are distinguished based on gain and pole locations. The early age cycles were comprised in a central region. When the system ages, its physical characteristics change and as a consequence estimated parameter locations expand. This expansion leads to the ability to distinguish three regions (early age, middle age, and aged cycles) as shown in FIG. 4.

Example 3. System Aging Along Growth Vector

The model used in this example is a combination of two infinite impulse response models. The first one relates current measured pressure to two back samples and the second relates current measured displacement to two back samples. The choice of this model was based on the parameter separation and on the fact that every system parameter depends directly on its back samples. An overall goal in model-based health monitoring for a BOP annular is fault accommodation and resulting impact on the system model, allowing the prediction of age and monitoring of the annular after every working cycle. Thus, the health-monitoring algorithm has to be online and based on analysis of fault transiency so that faults can be quickly isolated and identified. This will assure the accuracy of the prediction. The two infinite impulse response models are shown below.

$$p(i)=A_p p(i-1)+B_p p(i-2) \quad \text{IIR for the pressure:}$$

$$d(i)=A_d d(i-1)+B_d d(i-2) \quad \text{IIR for the displacement:}$$

In these models, p(i) is close pressure at the current time, p(i−1) is the first back sample of the close pressure, p(i−2) is the second back sample of the close pressure, $A_p$ and $B_p$ are the weights of first and second back samples respectively, d(i) is displacement at the current time, d(i−1) is the first back sample of the displacement, d(i−2) is the second back sample of the displacement, and $A_d$ and $B_d$ are the weights of first and second back samples respectively. In these models, integrated volumetric flow measurements could be used instead of displacement.

The data taken from the field was treated and resampled to a fixed sampling time. The recursive least square was applied to estimate model parameters (gain and pole). Each model reflects a type of faults, so both pressure and displacement cumulative effect must be taken into consideration. Parameters were added ($A_d+A_p$ and $B_d+B_p$) to find trace as summarized below and shown in FIG. 5.

The estimated parameters ($A_d+A_p$ and $B_d+B_p$) locations over cycles define a line, which describes the growth-vector. The graphical location along the growth vector shows whether the annular cycle is early, middle or highly aged. Regrouping neighboring cycles allows for distinguishing of different age regions. Early age cycles are from 1 to 13. Middle-aged cycles are from 14 to 20. Aged cycles are from 21 to 32. This movement from one region to another is due to change in physical characteristics and behavior of the annular over cycles, which indicates a deterioration of the properties of the annular.

What is claimed is:

1. A method for monitoring the health of a blow out preventer (BOP) annular system, comprising:
obtaining field data for a tested BOP annular system over a selected time frame, wherein the BOP annular system comprises one or more blow out preventer (BOP) annulars;
selecting a reduced order model describing the behavior of the tested BOP annular system and identifying parameters to use in the reduced order model, wherein the reduced order model and the parameters are:
an infinite impulse response model for pressure shown below:

$$p(i)=A_p p(i-1)+B_p p(i-2); \text{ and}$$

an infinite impulse response model for displacement shown below:

$$d(i)=A_d d(i-1)+B_d d(i-2),$$

wherein p(i) is close pressure at a current time, p(i−1) is a first back sample of close pressure, p(i−2) is a second back sample of the close pressure, $A_p$ and $B_p$ are weights of the first and second back samples of the close pressure, respectively, d(i) is displacement at the current time, d(i−1) is a first back sample of displacement, d(i−2) is a second back sample of the displacement, and $A_d$ and $B_d$ are weights of the first and second back samples of the displacement, respectively, and wherein the parameters are $A_d+A_p$ and $B_d+B_p$;
adapting the parameters to track changes in the tested BOP annular system using the reduced order model;
creating a graphical or numerical representation of the parameters over the selected time frame using the reduced order model for the tested BOP annular system;
assigning various health states of the tested BOP annular system to regions of the graphical or numerical representation;
obtaining field data for an unknown BOP annular system;
determining parameters of the unknown BOP annular system using the reduced order model;
locating the parameters of the unknown BOP annular system in a region of the graphical or numerical representation; and
identifying the health state of the unknown BOP annular system for that region, wherein the health state comprises an estimation of the remaining useful life of the unknown BOP annular system.

2. A method for monitoring the health of a blow out preventer (BOP) annular system, comprising:
obtaining field data for a tested BOP annular system over a selected time frame, wherein the BOP annular system comprises one or more blow out preventer (BOP) annulars;
selecting a reduced order model describing the behavior of the tested BOP annular system and identifying parameters to use in the reduced order model, wherein the reduced order model and the parameters are:
an infinite impulse response model for pressure shown below:

$$p(i)=A_p p(i-1)+B_p p(i-2); \text{ and}$$

an infinite impulse response model for integrated volumetric flow rate shown below:

$$d(i)=A_d d(i-1)+B_d d(i-2),$$

wherein p(i) is close pressure at a current time, p(i−1) is a first back sample of close pressure, p(i−2) is a second back sample of the close pressure, $A_p$ and $B_p$ are weights of the first and second back samples of the close pressure, respectively, d(i) is integrated volumetric flow rate at the current time, d(i−1) is a first back sample of integrated volumetric flow rate, d(i−2) is a second back sample of the integrated volumetric flow rate, and $A_d$ and $B_d$ are weights of the first and second back samples of the integrated volumetric flow rate, respectively, and wherein the parameters are $A_d+A_p$ and $B_d+B_p$;

adapting the parameters to track changes in the tested BOP annular system using the reduced order model;

creating a graphical or numerical representation of the parameters over the selected time frame using the reduced order model for the tested BOP annular system;

assigning various health states of the tested BOP annular system to regions of the graphical or numerical representation;

obtaining field data for an unknown BOP annular system;

determining parameters of the unknown BOP annular system using the reduced order model;

locating the parameters of the unknown BOP annular system in a region of the graphical or numerical representation; and identifying the health state of the unknown BOP annular system for that region, wherein the health state comprises an estimation of the remaining useful life of the unknown BOP annular system.

* * * * *